(12) United States Patent
Ichida et al.

(10) Patent No.: US 7,704,173 B2
(45) Date of Patent: Apr. 27, 2010

(54) MOTORIZED BICYCLE DERAILLEUR ASSEMBLY

(75) Inventors: Tadashi Ichida, Osaka (JP); Ryuichiro Takamoto, Osaka (JP); Haruyuki Takebayashi, Osaka (JP)

(73) Assignee: Shimano Inc., Osaka (JP)

( * ) Notice: Subject to any disclaimer, the term of this patent is extended or adjusted under 35 U.S.C. 154(b) by 776 days.

(21) Appl. No.: 11/349,334

(22) Filed: Feb. 8, 2006

(65) Prior Publication Data

US 2007/0184925 A1    Aug. 9, 2007

(51) Int. Cl.
 *F16H 9/00*   (2006.01)
 *F16H 59/00*  (2006.01)

(52) U.S. Cl. .......................................... 474/82; 474/80

(58) Field of Classification Search .................... 474/69, 474/70, 78–82; 74/500.5, 502.2; 701/51; 475/149; 280/236, 238, 260, 261
 See application file for complete search history.

(56) References Cited

U.S. PATENT DOCUMENTS

| | | | |
|---|---|---|---|
| 3,919,891 | A | 11/1975 | Stuhlmuller et al. |
| 5,059,158 | A | 10/1991 | Bellio et al. |
| 5,213,548 | A | 5/1993 | Colbert et al. |
| 5,356,348 | A | 10/1994 | Bellio et al. |
| 5,357,177 | A | 10/1994 | Fey et al. |
| 5,514,041 | A | 5/1996 | Hsu |
| 5,518,456 | A | 5/1996 | Kojima et al. |
| 5,577,969 | A | 11/1996 | Watarai |
| 5,681,234 | A | 10/1997 | Ethington |
| 5,860,880 | A | 1/1999 | Oka |
| 5,873,283 | A | 2/1999 | Chen et al. |
| 6,073,730 | A | 6/2000 | Abe |
| 6,282,976 | B1 | 9/2001 | Jordan et al. |
| 6,619,154 | B2 | 9/2003 | Campagnolo |
| 6,629,574 | B2 | 10/2003 | Turner |
| 6,648,782 | B2 | 11/2003 | Valle |
| 6,679,797 | B2 | 1/2004 | Vqlle |

(Continued)

FOREIGN PATENT DOCUMENTS

DE    4340471 C1    2/1995

(Continued)

OTHER PUBLICATIONS

Sharp Catalogue GP1S39; published prior to Jan. 20, 2006 (exact publication date is not known).

*Primary Examiner*—Bradley T King
*Assistant Examiner*—Thomas Irvin
(74) *Attorney, Agent, or Firm*—Global IP Counselors, LLP

(57) ABSTRACT

A motorized bicycle derailleur assembly has a motor unit, a movable part (e.g., a motor linkage, a derailleur linkage and/or a chain guide) and a controller. The movable part is in response to activation of the motor unit within a mechanical stroke. The motor unit has a motor output stroke with a prescribed maximum movement range that is larger than the mechanical stroke of the movable part. The movable part has an anti-jamming arrangement having an anti-jamming spring. The anti-jamming spring is configured and arranged to compress when the motor unit continues to apply a moving force to the movable part after the movable part reaches a lockup position. The controller is configured to set the motor unit output stroke to an operating movement range that is smaller than the prescribed maximum movement range so that the anti-jamming biasing element remains uncompressed during normal shifting operation.

8 Claims, 13 Drawing Sheets

U.S. PATENT DOCUMENTS

| | | | |
|---|---|---|---|
| 6,682,087 B1 | 1/2004 | Takeda | |
| 6,767,308 B2 * | 7/2004 | Kitamura | 477/7 |
| 6,979,009 B2 * | 12/2005 | Ichida et al. | 280/238 |
| 7,291,079 B2 * | 11/2007 | Ichida et al. | 474/80 |
| 7,306,531 B2 * | 12/2007 | Ichida et al. | 474/70 |
| 7,331,890 B2 * | 2/2008 | Ichida et al. | 474/80 |
| 7,341,532 B2 * | 3/2008 | Ichida et al. | 474/70 |
| 7,442,136 B2 * | 10/2008 | Ichida et al. | 474/82 |
| 7,503,863 B2 * | 3/2009 | Ichida et al. | 474/80 |
| 2002/0090304 A1 * | 7/2002 | Yoo et al. | 417/44.1 |
| 2002/0190173 A1 | 12/2002 | Fujii | |
| 2003/0092519 A1 * | 5/2003 | Fukuda | 474/70 |
| 2004/0063528 A1 | 4/2004 | Campagnolo | |
| 2004/0115962 A1 | 6/2004 | Kitamura et al. | |
| 2005/0192137 A1 * | 9/2005 | Ichida et al. | 474/70 |
| 2005/0192139 A1 * | 9/2005 | Ichida et al. | 474/80 |
| 2005/0197222 A1 * | 9/2005 | Tatsumi | 474/80 |
| 2005/0239587 A1 * | 10/2005 | Ichida et al. | 474/82 |
| 2006/0122015 A1 * | 6/2006 | Takamoto et al. | 474/80 |
| 2006/0189423 A1 * | 8/2006 | Ichida et al. | 474/80 |

FOREIGN PATENT DOCUMENTS

| | | |
|---|---|---|
| EP | 1010613 A1 | 6/2000 |
| EP | 1310423 A2 | 5/2003 |
| EP | 1357023 A1 | 10/2003 |
| WO | WO-97-07919 | 3/1997 |

* cited by examiner

MOTORIZED BICYCLE DERAILLEUR ASSEMBLY

BACKGROUND OF THE INVENTION

1. Field of the Invention

This invention generally relates to a motorized bicycle derailleur. More specifically, the present invention relates to a motorized bicycle derailleur assembly in which a chain guide has a range of movement between its top and low gear positions that is smaller than a range of movement outputted by a motor unit driving the chain guide between its top and low gear positions.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In fact, bicycles have recently been equipped with electrical components to make riding easier and more enjoyable for the rider. Some bicycles are equipped with automatic shifting units that are automatically adjusted according to the riding conditions by a cycle computer or control unit. In particular, the front and rear derailleurs have recently been automated.

Generally speaking, the front derailleur is secured to the seat tube of the bicycle frame or the bottom bracket, while the rear derailleur is secured to the rear triangle of the frame. In either case, a derailleur includes a fixed or base member non-movably secured to a bicycle frame, and a movable member supported to be movable relative to the fixed member via a linkage. The movable member typically has a chain guide with a pair of cage plates for moving a chain between the front or rear sprockets. The movable member is usually biased in a given direction relative to the fixed member by a spring. The movable member is usually moved relative to the fixed member by pulling and/or releasing a shift control cable that is coupled to the respective derailleur. In a manually operated derailleur, a control cable is connected to one of the pivotal links to apply a torque thereto, thereby causing the links to move the movable member. The control cable is fixed to the link in a position such that an operating force applied to the control cable is converted into a link swinging torque. The movement of the control cable is typically controlled by a shift operating device that has one or more levers, a winding member and in indexing mechanism in a conventional manner.

In recent years, derailleurs have been motorized. In a motorized derailleur, a motor is typically used to pull and release a control cable to move the movable member, or the motor is connected by a drive train (transmission) to the derailleur without a conventional control cable to move the movable member. In either case, the motor is typically an electric motor that is operatively coupled to a control unit. The control unit can automatically control the motor, and thus, automatically control movement of the movable member of the derailleur. Alternatively, electrical shift buttons can be provided, which are operatively coupled to the control unit such that the rider can control the shifting of the derailleur.

While these prior motorized derailleurs work relatively well, they do suffer from some deficiencies. In particular, one problem with these prior motorized derailleurs is that a drive motor is provided with a range of movement that does not match a range of movement of the chain guide between its top and low gear positions. This can result in an overcurrent in the motor, which can reduce the motor life as well as waste electrical power.

In view of the above, it will be apparent to those skilled in the art from this disclosure that there exists a need for an improved motorized bicycle derailleur assembly. This invention addresses this need in the art as well as other needs, which will become apparent to those skilled in the art from this disclosure.

SUMMARY OF THE INVENTION

One object of the present invention is to provide a motorized bicycle derailleur assembly in which a range of movement outputted by a motor unit driving a chain guide is made to substantially match a range of movement of the chain guide between its top and low gear positions.

Another object of the present invention is to provide a motorized bicycle derailleur assembly that is configured and arranged to be relatively easy to adjust.

Another object of the present invention is to provide a motorized bicycle derailleur assembly that is durable.

Another object of the present invention is to provide a motorized bicycle derailleur assembly that includes a jamming protection connection that is normally not engaged during normal movement of the motorized bicycle derailleur assembly.

The foregoing objects can basically be attained by providing a motorized bicycle derailleur assembly that basically comprises a motor unit, a movable part and a controller. The motor unit includes a motor output stroke with a prescribed maximum movement range. The movable part is operatively coupled to the motor unit to move in response to activation of the motor unit within a mechanical stroke. The movable part includes an anti-jamming arrangement having an anti-jamming spring. The anti-jamming spring is configured and arranged to compress when the motor unit continues to apply a moving force to the movable part after the movable part reaches a lockup position. The controller is operatively coupled to the motor unit. The controller is configured to set the motor unit output stroke to an operating movement range that is smaller than the prescribed maximum movement range so that the anti-jamming biasing element remains uncompressed during normal shifting operation.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
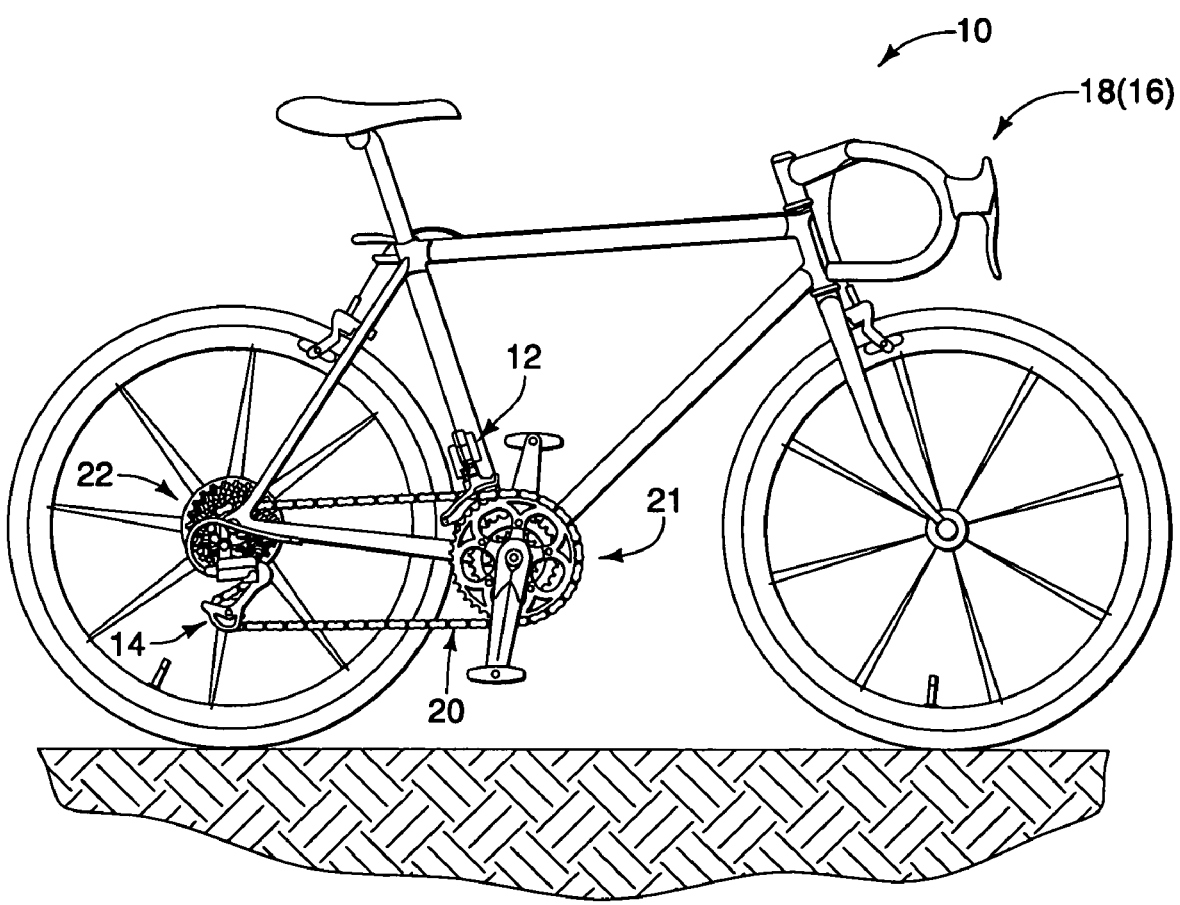
FIG. 1 is a side elevational view of a bicycle equipped with motorized front and rear derailleur assemblies in accordance with the present invention.
Figure 2:
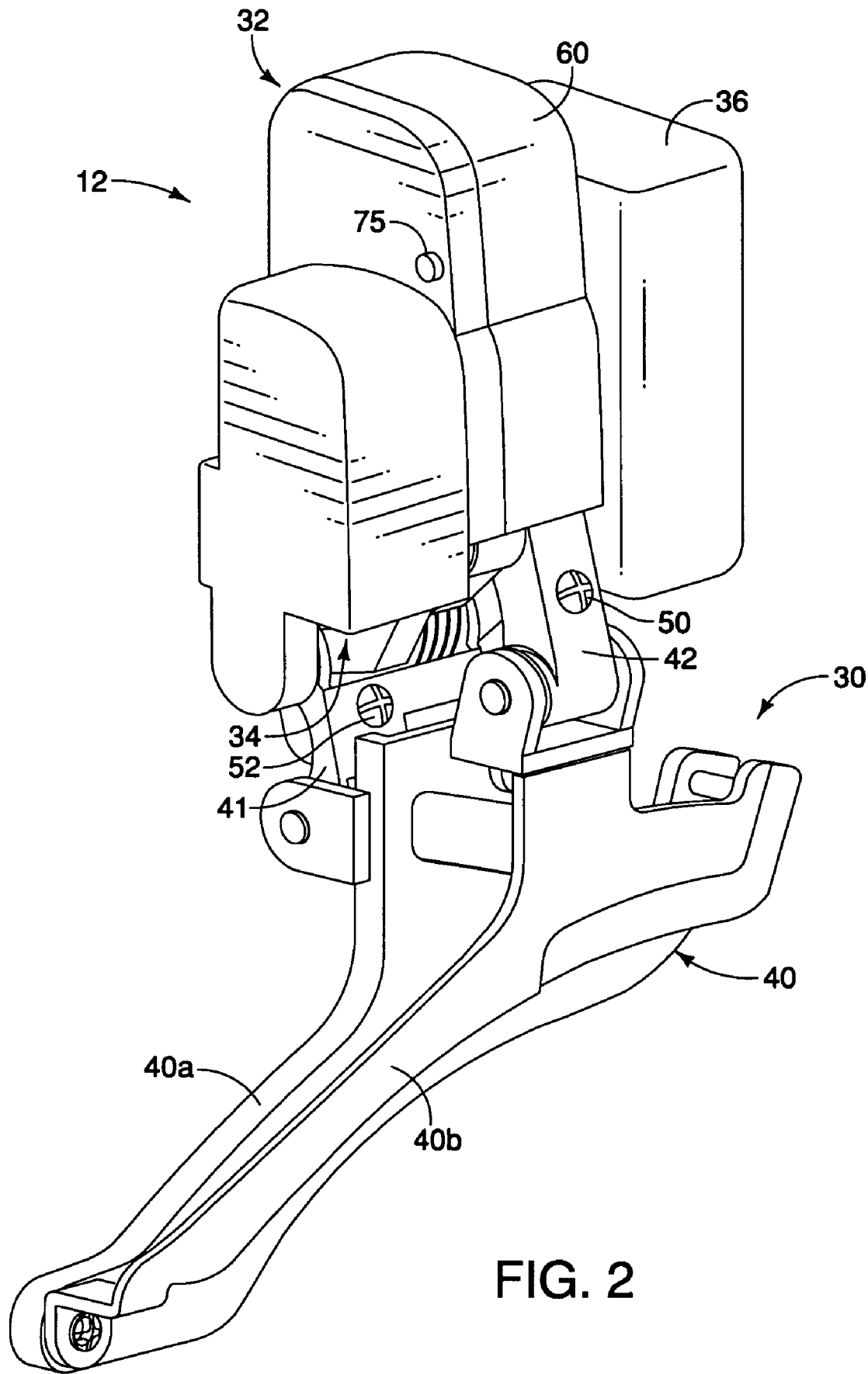
FIG. 2 is a rear perspective view of the motorized front derailleur assembly illustrated in FIG. 1, with the chain guide in the top position.
Figure 3:
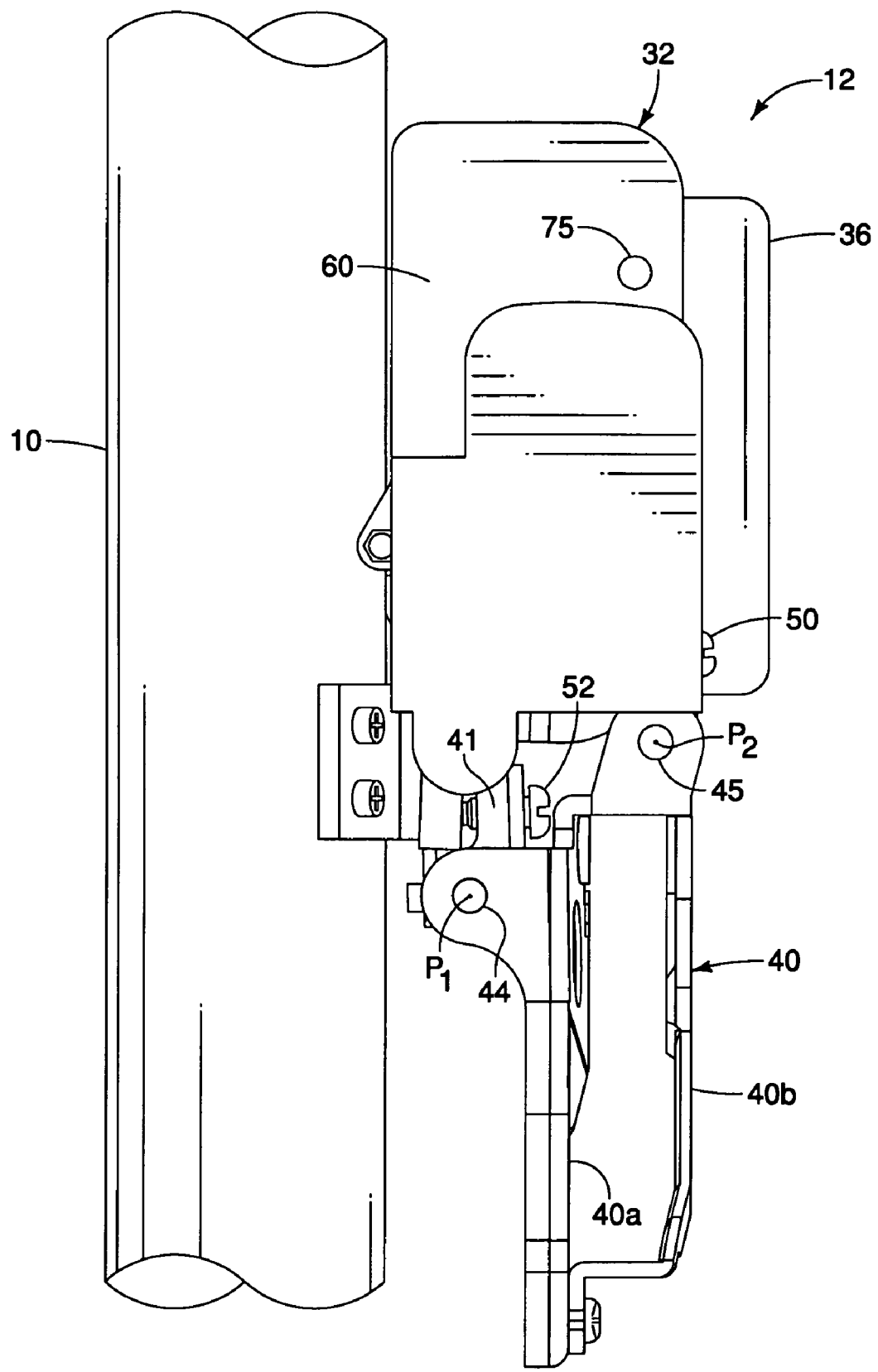
FIG. 3 is a rear elevational view of the motorized front derailleur assembly illustrated in FIG. 2, with the chain guide in the low position.
Figure 4:
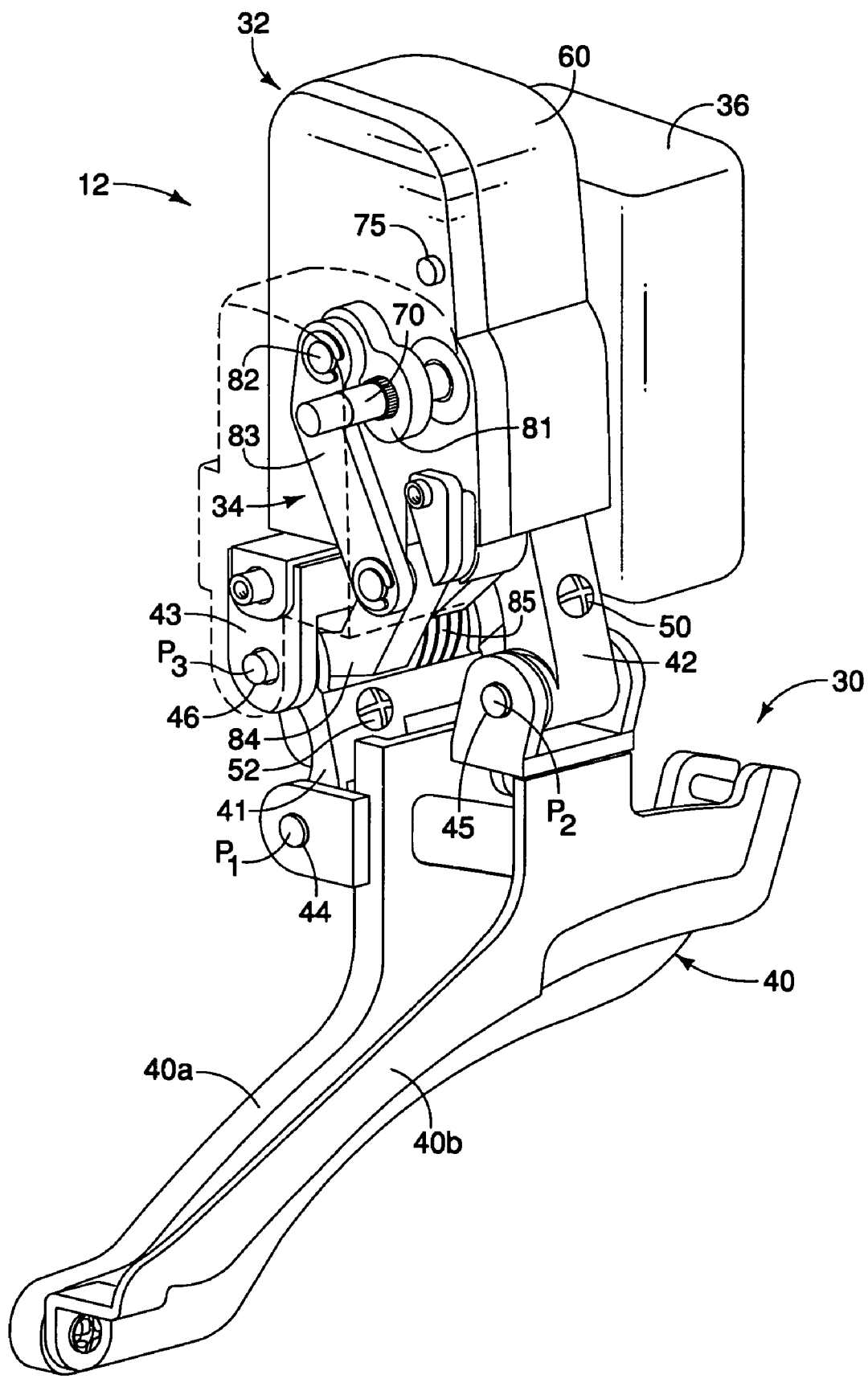
FIG. 4 is a rear perspective view of the motorized front derailleur assembly illustrated in FIGS. 2 and 3, with the chain guide in the top position and with the motor unit cover removed for the purpose of illustration, and with portions illustrated as simplified shapes (e.g. the drive link and the saver link) for the purpose of illustration.
Figure 5:
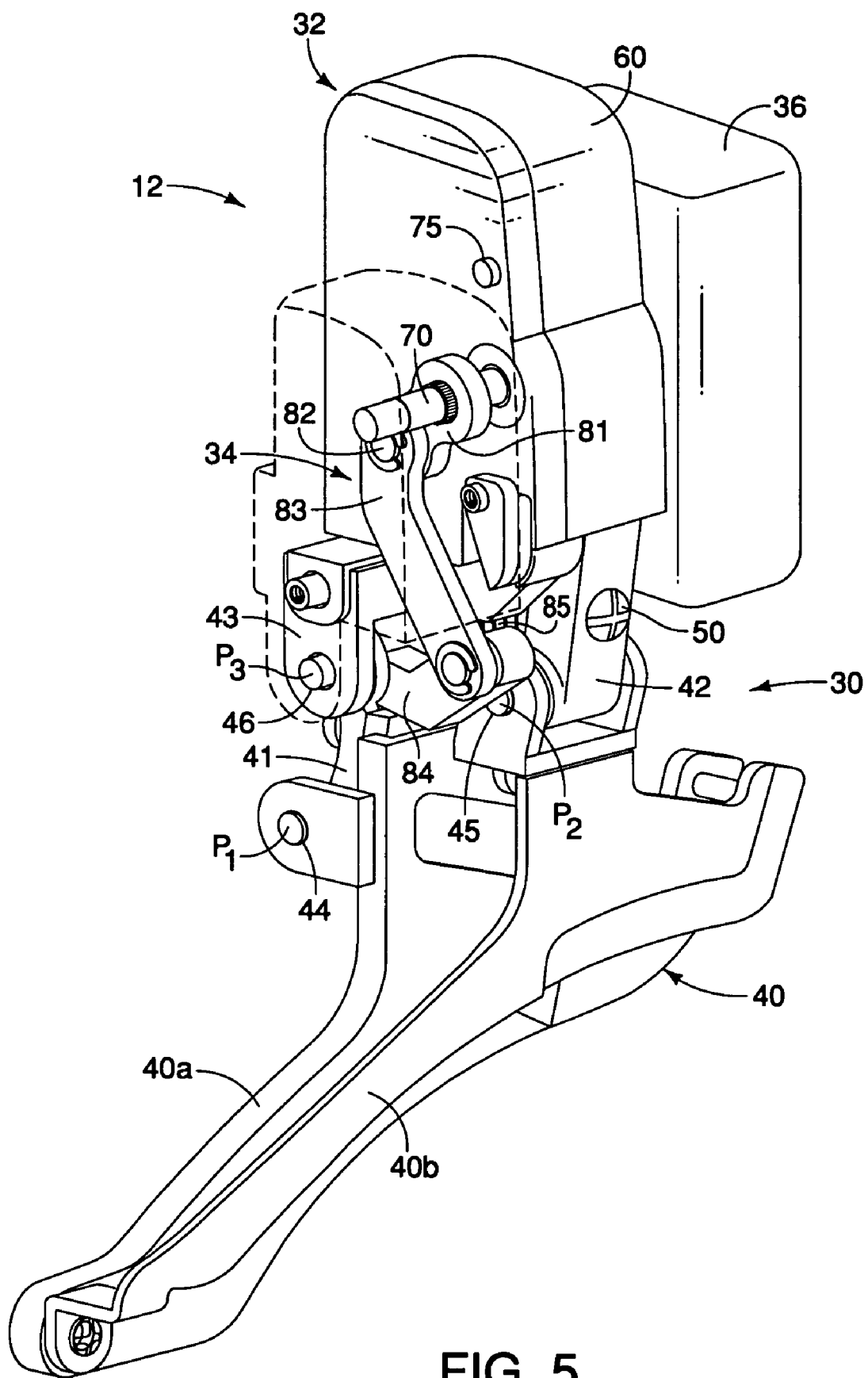
FIG. 5 is a rear perspective view of the motorized front derailleur assembly illustrated in FIGS. 2 and 3, with the chain guide in the low position and with the motor unit cover removed for the purpose of illustration, and with portions illustrated as simplified shapes (e.g. the drive link and the saver link) for the purpose of illustration.
Figure 6:
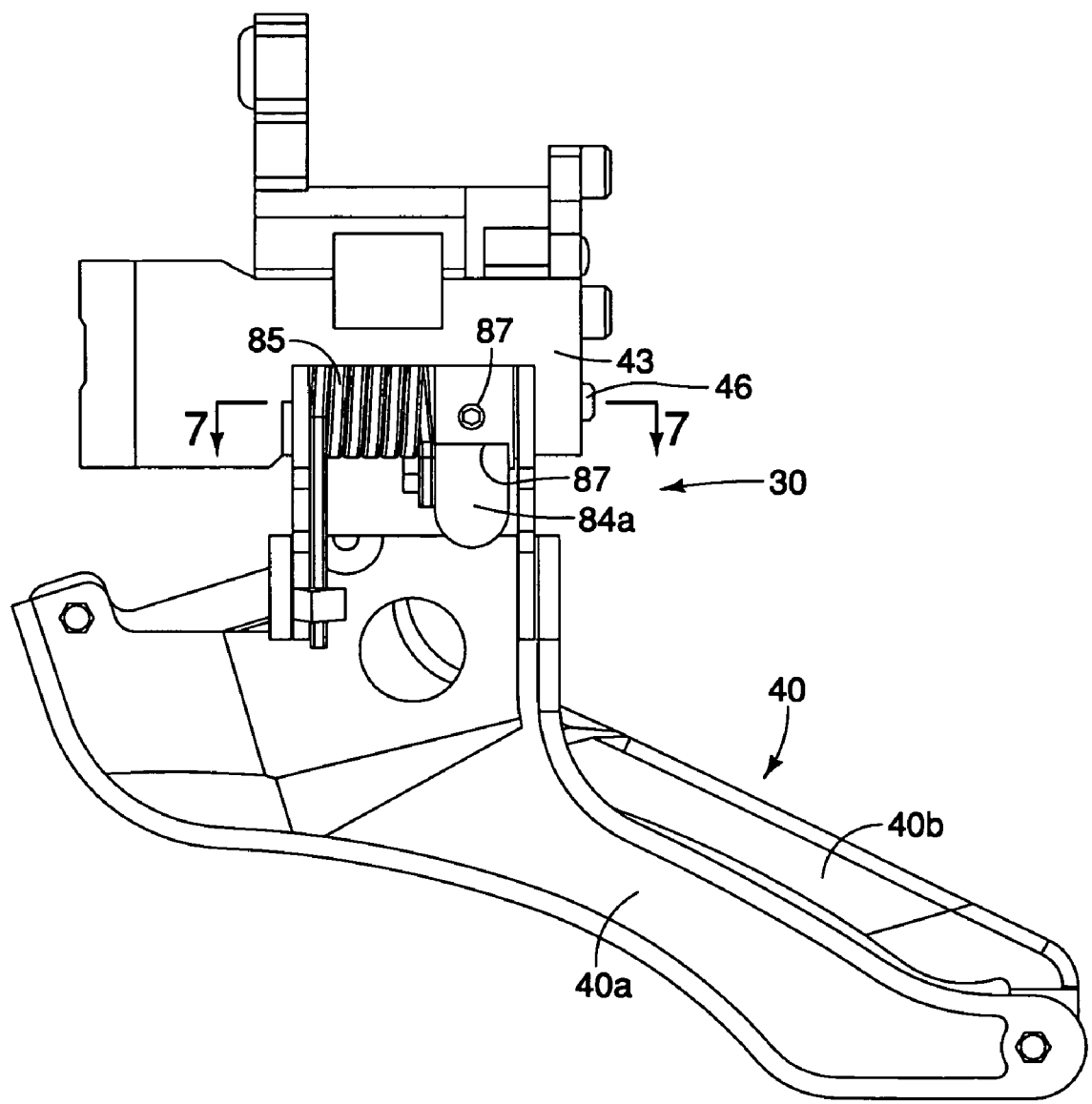
FIG. 6 is an inner side elevational view of the motorized front derailleur assembly illustrated in FIGS. 2-5, with the motor unit and portions of the motor linkage removed for the purpose of illustration.
Figure 7:
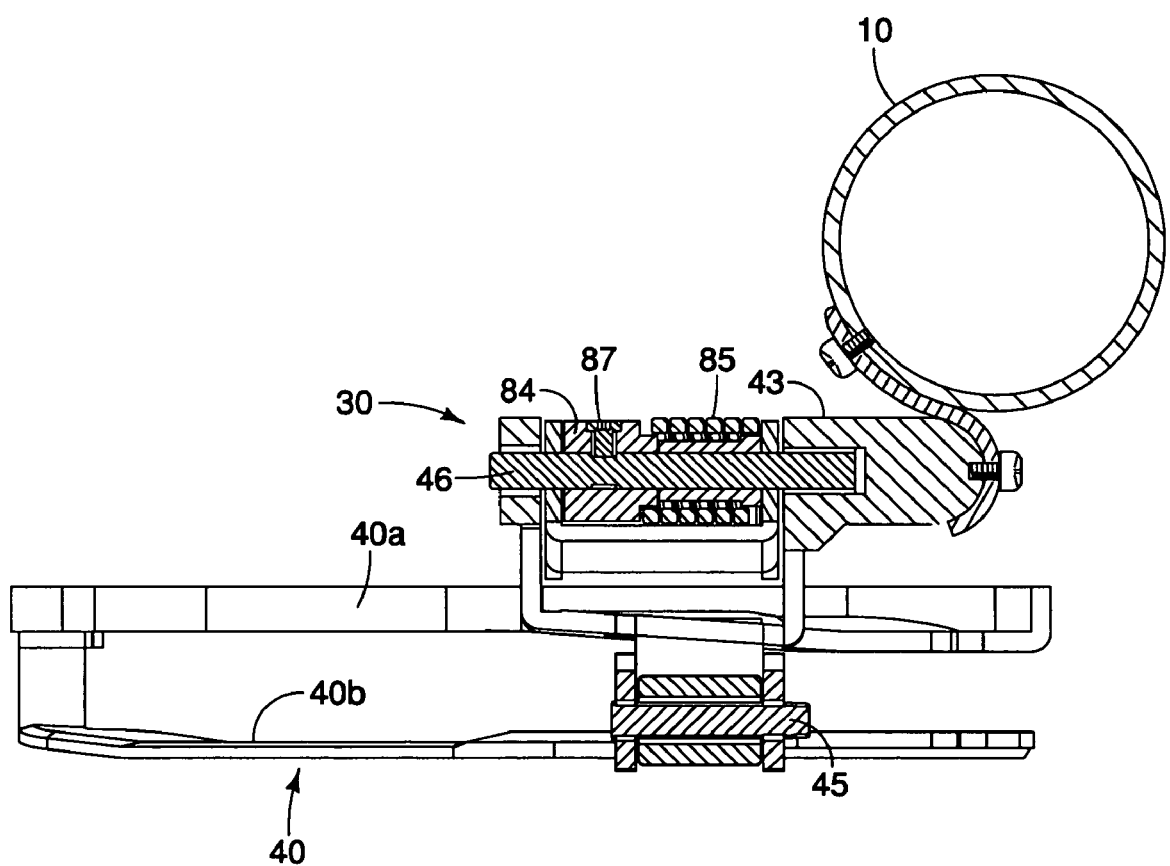
FIG. 7 is a partial cross-sectional view of the motorized front derailleur assembly illustrated in FIGS. 2-6, as seen along section line 7-7 of FIG. 6.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1-4, a bicycle 10 is illustrated that is equipped with a motorized bicycle front derailleur assembly 12 and a motorized rear derailleur assembly 14 in accordance with a first embodiment of the present invention. The front and rear derailleur assemblies 12 and 14 are actuated/operated in a conventional manner by a front electrical shift control device 16 and a rear electrical shift control device 18, respectively, to shift a chain 20 between various gears. In particular, the front derailleur assembly 12 shifts the chain 20 between a plurality of front sprockets 21, while the rear derailleur assembly 14 shifts the chain 20 between a plurality of rear sprockets 22.

The electrical shift control devices 16 and 18 are preferably provided with one or more shift operating members (not shown) that are operatively coupled to front and rear derailleur assemblies 12 and 14. The electrical shift control device 16 is basically a mirror image of the shift control device 18, and is located on the opposite side of the handlebar from the shift control device 18. Thus, the shift control device 16 is located behind (i.e. is hidden behind) the shift control device 18 in FIG. 1.

Since the majority of the parts of the bicycle 10 are well known in the bicycle art, these parts will not be discussed or illustrated in detail herein, except as they are modified to be used in conjunction with the present invention. Moreover, various conventional bicycle parts, which are not illustrated and/or discussed herein, can also be used in conjunction with the present invention.

Figure 11:
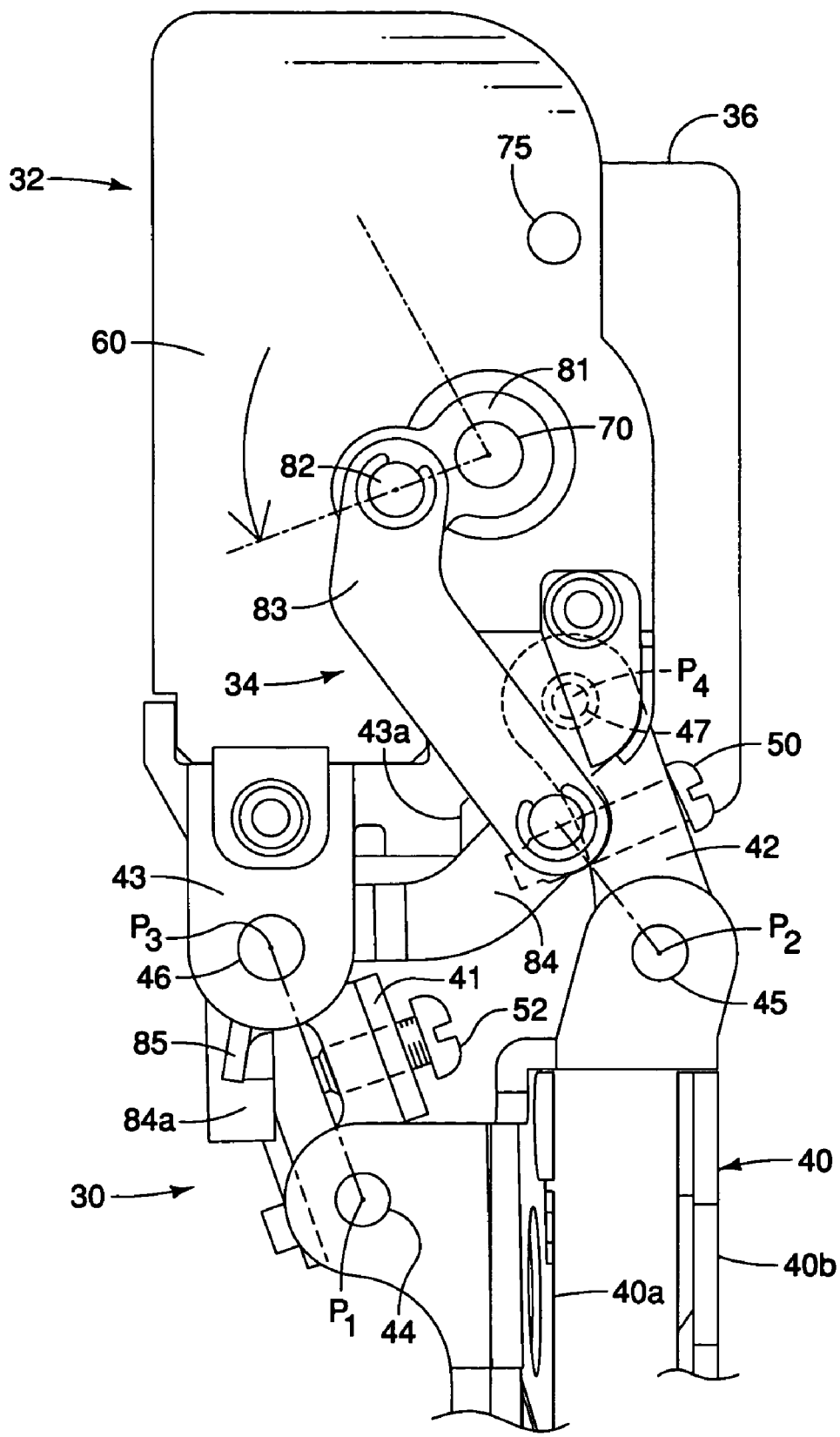
FIG. 11 is a partial, rear elevational view of the motorized front derailleur assembly illustrated in FIGS. 2-10, with the motor linkage moved into the low position/orientation and the derailleur linkage being held such that the chain guide remains in the top position (e.g. from a jam or the like)

Referring now to FIGS. 2-5, the motorized front derailleur assembly 12 basically includes a front derailleur unit 30, a front derailleur motor unit 32, a motor linkage 34 and a battery 36. The motorized front derailleur unit 30, the front derailleur motor unit 32, the motor linkage 34 and the battery 36 are all mounted together on a seat tube of the bicycle 10. Basically, the front derailleur unit 30 has a predetermined maximum chain cage range of movement between a top chain cage end position and a low chain cage end position. As explained below, the top and low chain cage end positions are mechanically adjustable to change the chain cage range of movement (hereinafter "mechanical stroke") of the front derailleur unit 30 to a predetermined set chain cage range of movement. The front derailleur motor unit 32 also has a prescribed maximum motor range of movement (hereinafter "prescribed maximum movement range") between a first motor end position and a second motor end position. As explained below, the prescribed maximum movement range can be electronically limited to substantially match the mechanical stroke of the front derailleur unit 30 that has been mechanically set. Moreover, as illustrated in FIG. 11, the motor linkage 34 is designed with a derailleur protection arrangement (i.e. a jamming protection connection) such that the derailleur motor unit 32 can be operated even though the motorized front derailleur unit 30 does not move (e.g. becomes jammed or the prescribed maximum movement range of the derailleur motor unit 32 does not match the mechanical stroke of the front derailleur unit 30. The basic operation of shifting the chain 20 is relatively conventional, and thus, will not be discussed and/or illustrated in detail herein.

Generally speaking, after the motorized front derailleur assembly 12 is installed, the front derailleur motor unit 32 is driven (e.g., shifted using the shift control device 16) to the first motor end position such that the front derailleur unit 30 moved to the top chain cage end position. Now, as explained below, the top chain cage end position can be mechanically adjusted to exactly match the first motor end position of the front derailleur motor unit 32. Next, the front derailleur motor unit 32 is driven (e.g., shifted using the shift control device 16) to the second motor end position such that the front derailleur unit 30 moved to the low chain cage end position. Now, as explained below, the low chain cage end position is mechanically adjusted to the desired location. However, the low chain cage end position does not match the second motor end position of the front derailleur motor unit 32 because of an anti-jamming arrangement that is provided in the motor linkage 34 such that the front derailleur motor unit 32 continues to move the motor linkage 34 after the front derailleur unit 30 has stopped at the low chain cage end position. Thus, the front derailleur motor unit 32 is operated to move the front derailleur unit 30 back and forth several times between the top chain cage end position and the low chain cage end position. As explained below, the front derailleur motor unit 32 measures the low chain cage end position and electronically sets a new second motor end position such that the prescribed maximum movement range is limited to match or substantially match the mechanical stroke of the front derailleur unit 30 that has been mechanically set.

As best seen in FIGS. 4, 5 and 8-11, the front derailleur unit 30 basically includes a chain cage or guide 40, an inner link 41, an outer link 42 and a fixing body 43. The fixing body 43 is preferably integrally formed as a one-piece, unitary member from a lightweight rigid material by casting, machining or the like in a conventional manner. Preferably, the fixing body 43 is constructed of a metallic material such as an aluminum alloy, titanium or the like. The fixing body 43 forms a derailleur motor support structure for supporting the front derailleur motor unit 32 thereon. The precise structure of the fixing body 43 is not important to the present invention, and thus, the fixing body 43 will not be discussed or illustrated in detail herein.

The inner and outer links 41 and 42 form a derailleur linkage (i.e., four-bar linkage) that movably connects the chain guide 40 to the fixing body 43 to control the lateral movement of the chain guide 40. Thus, the derailleur linkage is operatively coupled between the fixing body 43 and the chain guide 40 for lateral movement of the chain guide 40 relative to the fixing body 43 between at least a low chain cage end position and a top chain cage end position, i.e., at least first and second shift positions. More specifically, the chain guide 40 is movably coupled to the fixing body 43 by the inner and outer links 41 and 42, with the inner link 41 being operatively coupled to the motor linkage 34 to move the chain guide 40 between the first and second chain cage end positions in response to operation of the front derailleur motor unit 32. This lateral movement of the chain guide 40 causes the chain 20 to be shifted between the front sprockets 21 of the bicycle drive train. Thus, the motor linkage 34 together with the chain guide 40, the inner link 41 and the outer link 42 form a movable part of the motorized front derailleur assembly 12 that is shifted be the front derailleur motor unit 32 between the first and second shift positions. As explained below, the links 41 and 42 of the movable part include a mechanical adjustment device that is configured and arranged to change at least one (preferably both) of first and second shift positions of the mechanical stroke.

The chain guide 40 is preferably constructed of a hard rigid material. For example, the chain guide 40 is preferably constructed of a metal material such as a rigid sheet metal that is bent to the desired shape. As best seen in FIGS. 8-11, the chain guide 40 has inner and outer (first and second) shifted pivot points $P_1$ and $P_2$, respectively, for pivotally securing the chain guide 40 relative to the fixing body 43. In particular, the fixing body 43 pivotally supports the chain guide 40 by a pair of pivot pins 44 and 45. The chain guide 40 has a chain receiving slot that is formed by a pair of (inner and outer) vertical shift plates 40a and 40b. The vertical shift plates 40a and 40b are adapted to engage the chain 20, and thus, to move the chain 20 in a direction substantially transverse to the bicycle 10.

Referring now to FIGS. 8-11, basically, the inner link 41 and the outer link 42 have first or upper ends pivotally coupled to the fixing body 43 and second or lower ends pivotally coupled to the chain guide 40. Specifically, the inner link 41 has a first inner link end pivotally coupled to a fixed inner (first) pivot point $P_3$ of the fixing body 43 by a pivot pin 46 and a second inner link end pivotally coupled to the shifted inner pivot point $P_1$ of the chain guide 40 by the pivot pin 44. Similarly, the outer link 42 has a first outer link end pivotally coupled to a fixed outer (second) pivot point $P_4$ of the fixing body 43 by a pivot pin 47 and a second outer link end pivotally coupled to the shifted outer pivot point $P_2$ of the chain guide 40 by the pivot pin 45. As apparent from the discussion above, the pivot axes of the pivot points $P_1$, $P_2$, $P_3$ and $P_4$ are all substantially parallel to each other.

When the chain guide 40 in its extended position, the chain guide 40 is located over the outermost one of the sprockets 21, i.e., the furthest sprocket from the center plane of the bicycle 10. When the chain guide 40 in its retracted position, the chain guide 40 is located over the innermost one of the sprockets 21, i.e., the center plane of the bicycle 10. These movements of the chain guide 40 are controlled by a rider operating the shift control device 16 to drive the front derailleur motor unit 32 which in turn moves the chain guide 40.

As previously mentioned, the movable part (links 41 and 42) include a mechanical adjustment device that is configured and arranged to change at least one (preferably both) of first and second shift positions of the mechanical stroke. The mechanical adjustment device is configured and arranged to independently change both of the first and second shift positions of the mechanical stroke. In particular, the outer link 42 includes a threaded hole that receives a low position adjustment screw 50 and the inner link 41 includes a threaded hole that receives a top adjustment screw 52.

As seen in FIGS. 8-11, the low adjustment screw 50 is arranged and configured to such that the free end of the low adjustment screw 50 selectively contacts an abutment 43a of the fixing body 43 to selectively limit the amount of laterally inward movement of the chain guide 40 in order to finely adjust the low position of the chain guide 40. Thus, the low adjustment screw 50 and the screw contact portions of the outer link 42 form a first adjusting part of the mechanical adjustment device that finely adjusts the low position of the chain guide 40. In other words, once the low adjustment screw 50 is screwed a predetermined amount through the outer link 42, the free end of the low adjustment screw 50 will contact the fixing body 43 when the chain guide 40 is moved from the top position to the low position to limit inward movement of the chain guide 40. The contact point can be gradually changed/adjusted when the low adjustment screw 50 is gradually screwed further through the outer link 42.

As seen in FIGS. 8-11, the top adjustment screw 52 is arranged and configured to such that the free end of the top adjustment screw 52 selectively contacts the motor linkage 34 to selectively limit the amount of laterally inward movement of the chain guide in order to finely adjust the top position of the chain guide 40. The adjustment of the top position of the chain guide 40 will be discussed in more detail below. The top adjustment screw 52 and the screw contact portions of the inner link 41 form a second adjusting part of the mechanical adjustment device that finely adjusts the top position of the chain guide 40. The top adjustment screw 52 is a first adjustment screw, while the low adjustment screw 50 is a second adjustment screw. Each of the adjustment screws 50 and 52 is also preferably threaded through a plastic washer member (not shown) to prevent accidental loosening thereof.

Thus, the mechanical adjustment device is configured and arranged to change the first and second shift positions (e.g. the low and top positions) of the chain guide 40 relative to the fixing body 43. In other words, the low adjustment screw 50 is configured and arranged to change the low shift position of the chain guide 40 relative to the fixing body 43, while the top adjustment screw 52 is configured and arranged to change the top chain cage end position of the chain guide 40 relative to the fixing body 43. While the adjustment screws 50 and 52 are preferably mounted on the outer link 42 and the inner link 41, respectively, it will be apparent to those skilled in the art from this disclosure that the adjustment screws 50 and 52 could be mounted in other locations.

Figure 8:
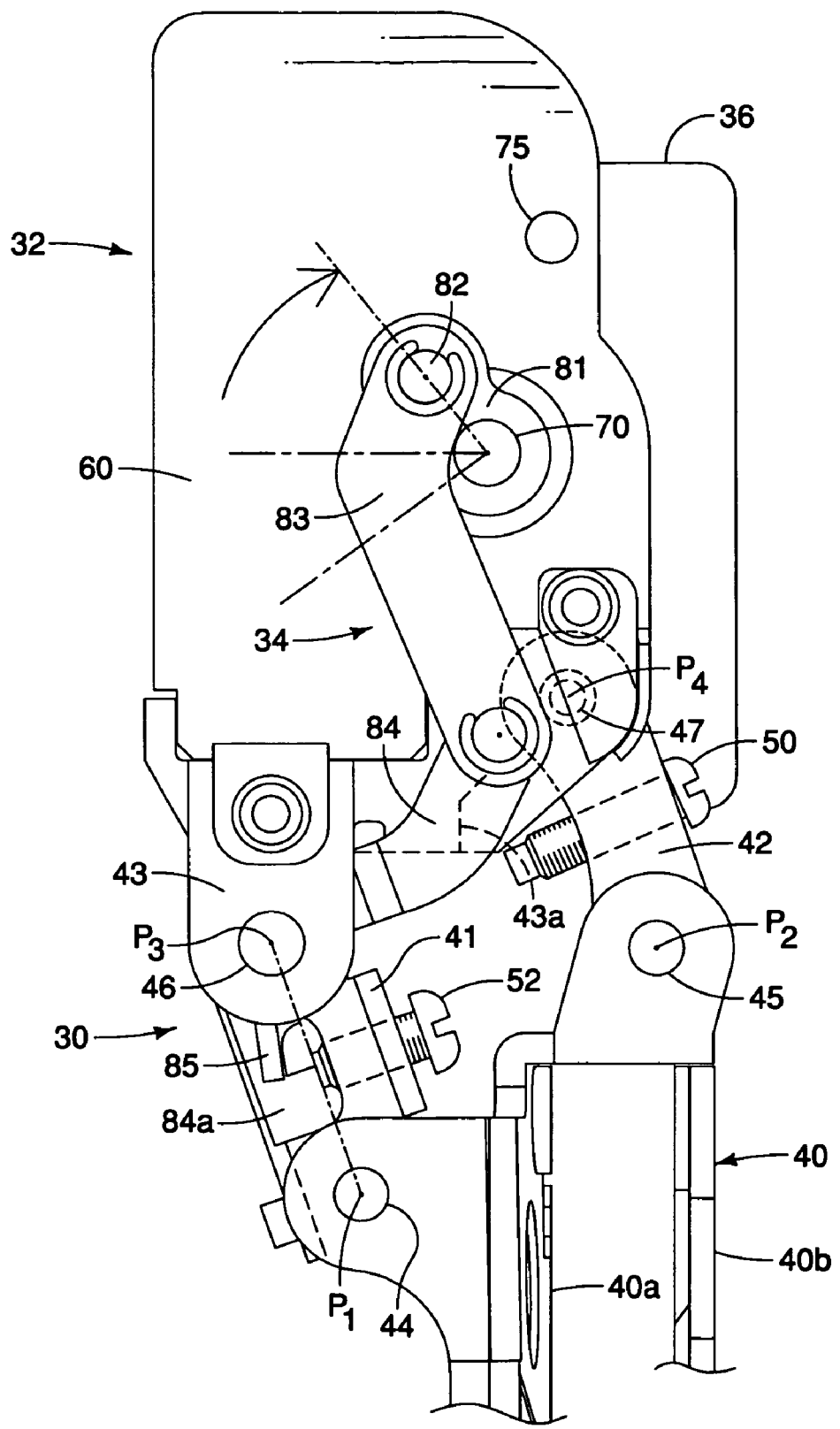
FIG. 8 is an enlarged, partial rear elevational view of the motorized front derailleur assembly illustrated in FIGS. 2-7, with the chain guide in the top position, and with the motor unit cover removed for the purpose of illustration.
Figure 9:
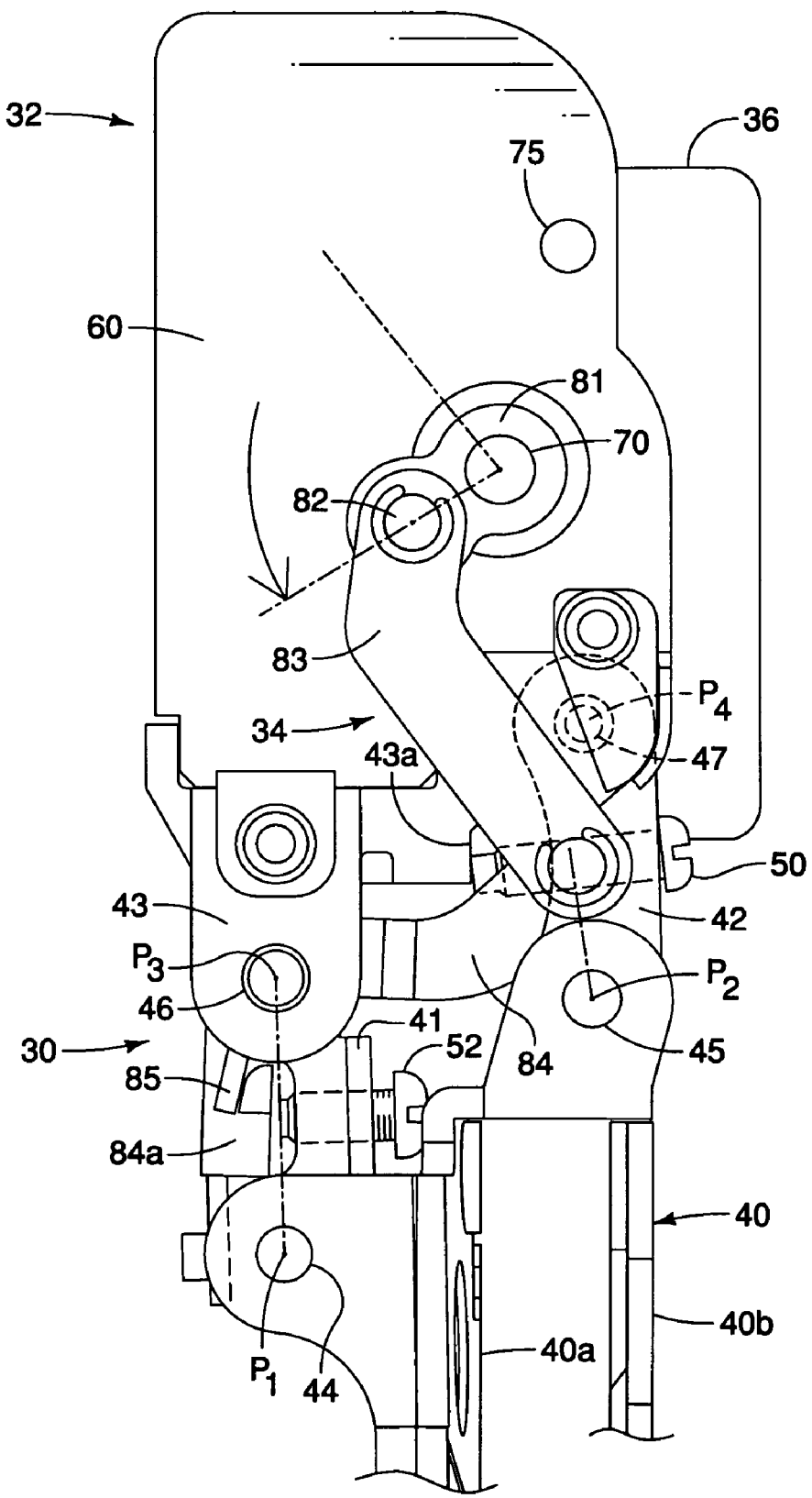
FIG. 9 is an enlarged, partial rear elevational view of the motorized front derailleur assembly illustrated in FIGS. 2-8, with the chain guide in the low position, and with the motor unit cover removed to show the positions of the adjusting screws prior to setting the low stop position of the motor.
Figure 10:
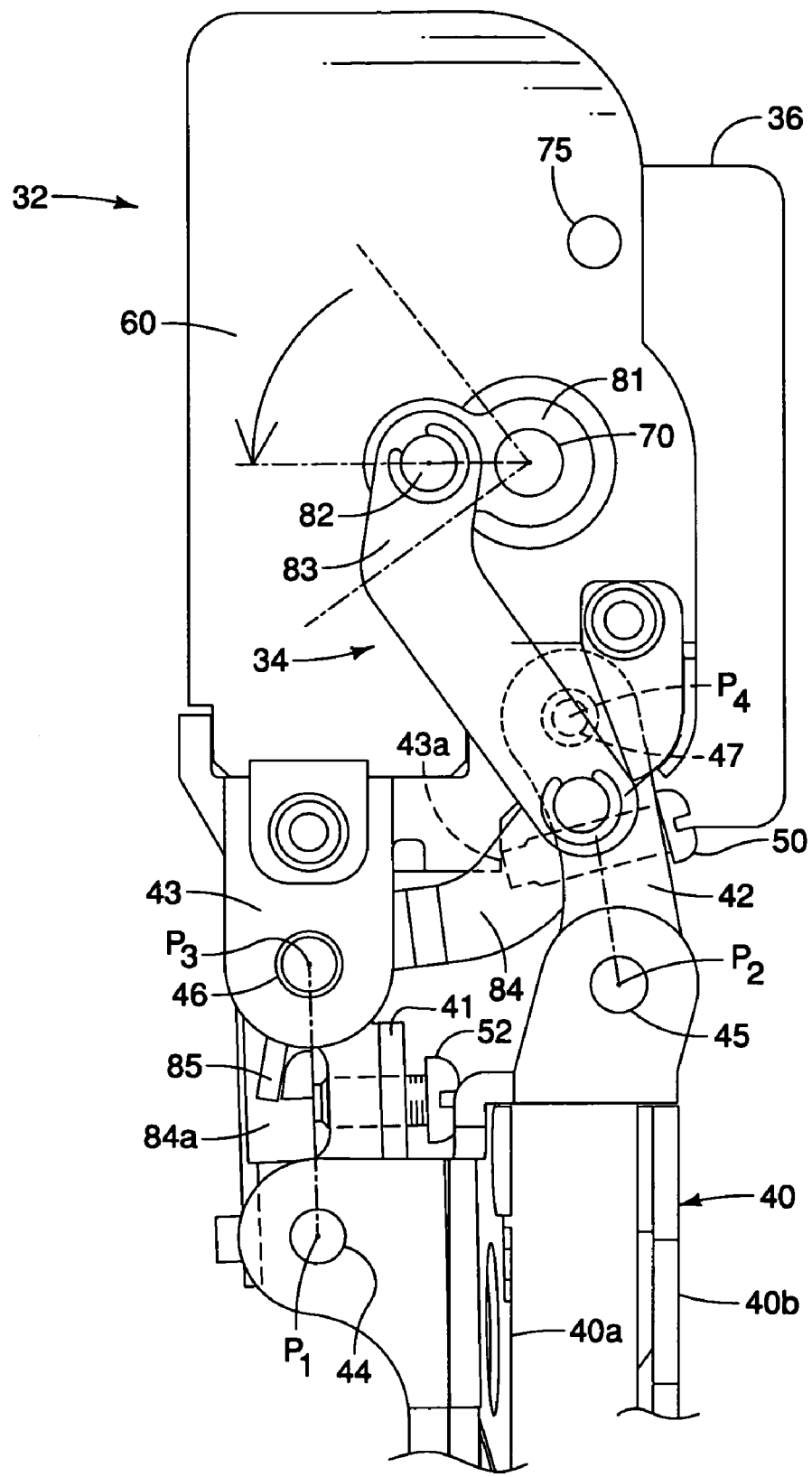
FIG. 10 is an enlarged, partial rear elevational view of the motorized front derailleur assembly illustrated in FIGS. 2-9, with portions broken away and portions illustrated in cross-section to show the chain guide in the low position and the positions of the adjusting screws after to setting the low stop position of the motor.

In the illustrated embodiment, when the prescribed maximum movement range of the front derailleur motor unit 32 is electronically limited to substantially match the mechanical stroke of the front derailleur unit 30 that has been mechanically set, then the top adjustment screw 52 remains in contact with the motor linkage 34 during shifting. However, if the front derailleur motor unit 32 is driven to its maximum second end position, then the top adjustment screw 52 will separate from the motor linkage 34. Typically, during normal use the low adjustment screw 50 will be configured to contact the fixing body 43 to limit inward movement of the inner and outer links 41 and 42 and the second end position of the prescribed maximum movement range of the front derailleur motor unit 32 will be electronically limited to substantially match the low chain cage end position of the front derailleur unit 30 such that the top adjustment screw 52 remains in contact with the motor linkage 34 as seen in FIGS. 8 and 10.

Figure 12:
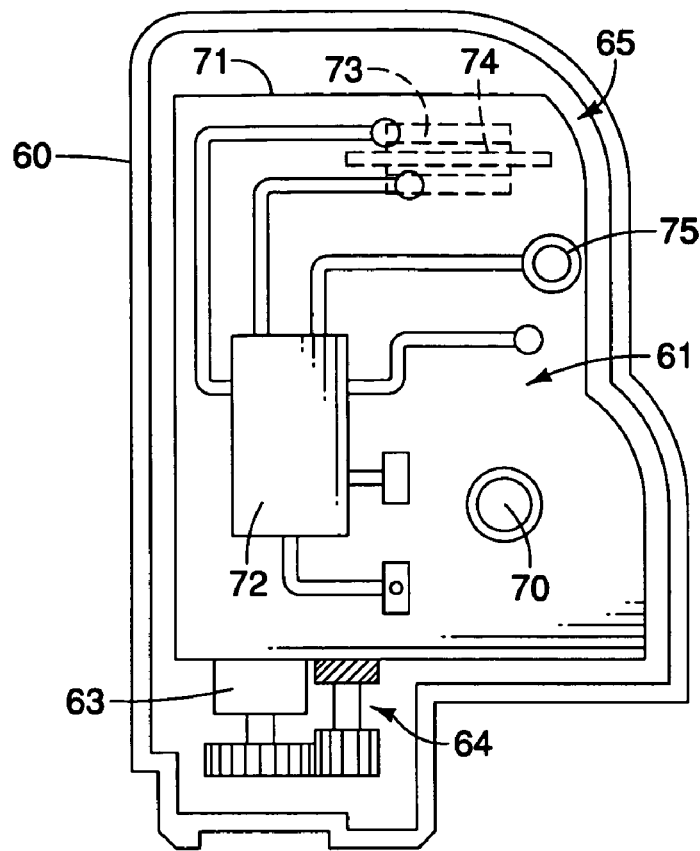
FIG. 12 is a rear elevational view of the motor unit with a portion of the housing removed to illustrate the printed circuit board disposed with in the motor unit.
Figure 13:
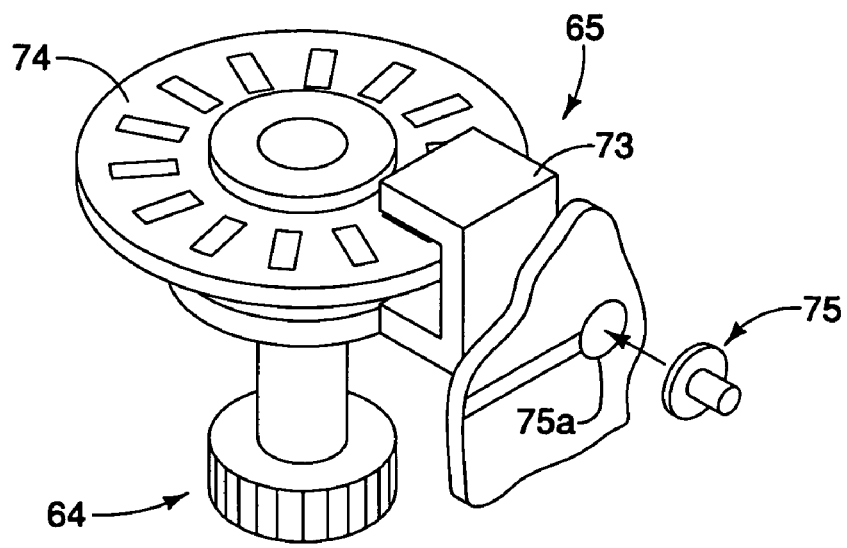
FIG. 13 is a partial perspective view of portion of the printed circuit board, the photointerrupter and the position sensor element or shutter wheel.

Referring now to FIGS. 12 and 13, the front derailleur motor unit 32 includes a motor unit casing or housing 60 with an electronic controller 61 disposed therein. The front derailleur motor unit 32 also includes an internal motor structure 62 having a reversible electric motor 63 and a motor drive train 64. Also a position control mechanism 65 is disposed in the motor unit housing 60 to determine the rotational position of the reversible electric motor 63 by detecting a relative position of the motor drive train 64. In the illustrated embodiment, the motor unit housing 60 is removably mounted to the fixing body 43 of the front derailleur unit 30, while the battery 36 is removably mounted to the motor unit housing 60. The battery 36 is electrically connected to the reversible electric motor 63 to supply electrical power thereto.

Generally speaking, operation of the front derailleur motor unit 32 is accomplished by a rider operating the shift control device 16 to drive the reversible electric motor 63 which in turn causes the chain guide 40 to be shifted between the low and top chain cage end positions. More specifically, the motor drive train 64 has an output shaft 70 that is rotatably supported by the motor unit housing 60 to project out of the motor unit housing 60 to drive the motor linkage 34 that is connected to the inner link 41. This movement of the motor linkage 34 causes the chain guide 40 to be shifted between the low and top chain cage end positions. Thus, the reversible electric motor 63 has a motor output stroke with the prescribed maximum movement range as mentioned above.

The motor drive train 64 includes a plurality of gears operatively coupled between an output shaft of the reversible electric motor 63 and the output shaft 70. The precise construction of the motor drive train 64 is not important to the present invention. Thus, the motor drive train 64 will not be discussed or illustrated in detail. In fact, the motor drive train 64 is illustrated in a simplified form for purposes of illustration As mentioned above, the electronic controller 61 is disposed within the motor unit housing 60. The electronic controller 61 is a processing mechanism that preferably includes a printed circuit board 71 with a microcomputer 72 with other conventional components such as an input interface circuit, an output interface circuit, and storage devices such as a ROM (Read Only Memory) device and an internal RAM (Random Access Memory) device. Thus, the printed circuit board 71 has a plurality of electrical circuits formed thereon in a conventional manner for controlling the operation of the reversible electric motor 63 via the microcomputer 72 in response to signals from the shift control device 16, the position control mechanism 65 as well as other sensors as such a wheel rotation sensor and a crank rotation sensor. The microcomputer 72 executes shifting control programs in the storage devices that control the front and rear derailleur assemblies 12 and 14. The internal RAM device of the electronic controller 61 stores statuses of operational flags and various control data. The internal ROM device of the electronic controller 61 stores the predetermined parameter for various shifting operations.

The electronic controller 61 is operatively coupled to the front derailleur motor unit 32 to set the motor unit output stroke to an operating movement range that is smaller than the prescribed maximum movement range. The electronic controller 61 also preferably includes a front derailleur motor driver for providing signals that operates the front derailleur assembly 12, and a rear derailleur motor driver for providing signals that operates the rear derailleur assembly 14. Thus, the electronic controller 61 is operatively coupled to the reversible electric motor 63 and the position control mechanism 65. The electronic controller 61 controls the reversible electric motor 63 in response to operating switches of the shift control device 16 being operated. The electronic controller 61 is configured to detect the low chain cage end position of the chain guide 40 by using the position control mechanism 65 and/or an overcurrent detection circuit on the printed circuit board 71.

As seen in FIGS. 12 and 13, the position control mechanism 65 is a digital position sensor that is partially integrated into the printed circuit board 71 of the electronic controller 61 and partially integrated into the motor drive train 64. In particular, the position control mechanism 65 includes a photointerrupter 73 mounted on the printed circuit board 71 and a position sensor element or shutter wheel 74 mounted on a part of the motor drive train 64. Thus, the position sensor element or shutter wheel 74 constitutes a detection part that is moved by the front derailleur motor unit 32 and arranged to be detected by the photointerrupter 73. The position control mechanism 65 is also provided with a motor end position adjusting button 75 that is mounted on the printed circuit board 71 to selectively engage a printed contact 75a on the printed circuit board 71 as seen in FIG. 13. When the motor end position adjusting button 75 is pushed by the rider, the electronic controller 61 marks the current position of the shutter wheel 74 using the photointerrupter 73. In particular, when the motor end position adjusting button 75 is pushed by the rider, the electronic controller 61 activates the reversible electric motor 63 which moves the motor drive train 64 which in turn moves the chain guide 40 via the motor linkage 34 and the links 41 and 42. This movement of the motor drive train 64 turns the shutter wheel 74 so that the photointerrupter 73 detects the position of the reversible electric motor 63 and correlates it as the low chain cage end position of the chain guide 40. In other words, the motor end position adjusting button 75 is pushed by the rider, when the chain guide 40 has been adjusted to its low chain cage end position by the low adjustment screw 50. Thus, the position control mechanism 65 operatively coupled to the electronic controller 61 to at least provide a first end position signal indicative of a first end stopping position of the reversible electric motor 63 of the front derailleur motor unit 32 to the electronic controller 61. Alternatively, if a rider first set the low chain cage end position to exactly match or substantially match the second motor end position, then upon pushing the motor end position adjusting button 75, the position control mechanism 65 will use the photointerrupter 73 to detect the position of the reversible electric motor 63 and correlates it as the top chain cage end position of the chain guide 40.

While preferably, the position control mechanism 65 (the photointerrupter 73 and the shutter wheel 74) are disposed in the motor unit housing 60 that houses the reversible electric motor 63, it will be apparent to those skilled in the art from this disclosure that other configurations are possible. The photointerrupter 73 is preferably a dual channel or double-phase type photointerrupter having a light source or LED disposed on one side of the shutter wheel 74 and a light detector such as a phototransistor disposed on the other side of the shutter wheel 74. Thus, the angular position of the output shaft 70 is determined by utilizing the shutter wheel 74 and the photointerrupter 73. The shutter wheel 74 is mounted on a shaft of one of the gears of the motor drive train 64 such that the shutter wheel 74 rotates therewith. The shutter wheel 74 is provided with a plurality of circumstantially spaced apart openings that are detected by the photointerrupter 73. In other words, the photointerrupter 73 senses the openings in the shutter wheel 74 to determine the relative position of the output shaft of the reversible electric motor 63. Thus, the electronic controller 61 electronic controller 61 can also determine the position of the chain guide 40 based on the relative position of the motor drive train 64.

Referring now to FIGS. 8-11, the motor linkage 34 is operatively coupled between the output shaft 70 and the inner link 41. The motor linkage 34 basically includes a drive arm 81 with an eccentric pin 82, a drive or motor link 83, a saver link 84 and a saver link biasing element 85. The drive arm 81 is mounted to the output shaft 70 such that a center axis of the eccentric pin 82 that is offset from a center rotational axis of the output shaft 70. Thus, when the output shaft 70 is rotated, the eccentric pin 82 moves along a circular path around the rotational axis of the output shaft 70. The saver link biasing element 85 is operatively coupled between the saver link 84 and the inner link 41.

The inner link 41, the saver link 84 and the saver link biasing element 85 form the jamming protection connection between the motor linkage 34 and the inner link 41. In particular, part of the inner link 41, part of the saver link 84 and the saver link biasing element 85 form the jamming protection connection. This jamming protection arrangement is configured and arranged to move between a force transmitting state and a force override state. More specifically, the drive link 83 is pivotally mounted to the eccentric pin 82 and the saver link 84, while the saver link 84 is pivotally coupled to the drive link 83 and the inner link 41. The biasing element 85 is operatively coupled between the inner link 41 and the saver link 84 to normally maintain a rigid connection (i.e. a normally rigid state) therebetween, as explained below. The biasing element 85 is configured and arranged to compress when the reversible electric motor 63 of the front derailleur motor unit 32 continues to apply a moving force to the movable part (the motor linkage 34, the chain guide 40, the inner link 41 and the outer link 42) after the movable part reaches a lockup position (e.g., when the low adjustment screw 50 limits inward movement of the inner link 41 or when an obstruction limits inward movement).

The jamming protection connection arranged between the drive link 83 and the inner link 41 such that the drive link 83 is permitted to move from an outer shift orientation to an inner shift orientation even if the chain guide 40 is prohibited from moving to the inner shift position from the outer shift position.

The saver link 84 preferably has a control or stop flange 84*a*. The first end of the saver link 84 is pivotally coupled to the second drive link end of the drive link 83 by the pivot pin 86. The second end of the saver link 84 is operatively coupled to the inner link 41. In particular, the second end of the saver link 84 includes a through hole with the pivot pin 46 extending therethrough with a set screw 87 engaging a flat surface of the pivot pin 46 to prevent rotation and axial movement of the pivot pin 46 relative to the saver link 84. The first end of the inner link 41 is rotatably mounted on the pivot pin 46.

The control or stop flange 84*a* extends from the second end of the saver link 84 and is arranged to selectively contact the free end of the top adjustment screw 52 therein such that the top adjustment screw 52 when the motor linkage 34 is driven between the top and low shift positions. Thus, the top adjustment screw 52 is configured and arranged to change the top chain cage end position of the chain guide 40 relative to the fixing body 43 by the free end of the top adjustment screw 52 contacting the stop flange 84*a*.

As best seen in FIGS. 8-11, the saver link biasing element 85 is preferably a torsion spring having a coiled portion mounted on the pivot pin 46, a first leg portion engaging the saver link 84 and a second leg portion engaging the inner link 41. The saver link 84 is biased in a counterclockwise direction about the pivot point $P_3$ as viewed from the rear of the derailleur. On the other hand, the inner link 41 is biased in a clockwise direction about the pivot pin 46 as viewed from the rear of the derailleur. Thus, the saver link biasing element 85 constitutes an anti-jamming spring that is configured and arranged to be compressed when the reversible electric motor 63 of the front derailleur motor unit 32 continues to apply a moving force to the movable part (the motor linkage 34, the chain guide 40, the inner link 41 and the outer link 42) after the movable part reaches a lockup position (e.g., when the low adjustment screw 50 limits inward movement of the inner link 41 or when an obstruction limits inward movement). When the electronic controller 61 sets the range of movement of the reversible electric motor 63 such that the motor unit output stroke is in an operating movement range that is smaller than the prescribed maximum movement range so that the saver link biasing element 85 remains uncompressed during normal shifting operation. In other words, the electronic controller 61 limits the prescribed maximum movement range to match or substantially match the mechanical stroke of the front derailleur unit 30 that has been mechanically set, then the saver link biasing element 85 remains uncompressed during normal shifting operation.

Thus, the top adjustment screw 52 is normally biased toward the saver link 84 to contact the saver link 84, unless the low adjustment screw 50 or an obstruction (jam) prevents such contact. In other words, the saver link biasing element 85 is configured and arranged to apply an urging force that normally maintains a substantially rigid connection between the saver link 84 and the inner link 41 so that these members normally move substantially together as a unit, except when the low adjustment screw 50 limits inward movement of the inner link 41 or when an obstruction limits inward movement. Accordingly, the saver link 84 is pivotally coupled to the inner link 41 and the saver link biasing element 85 is operatively coupled between the saver link 84 and the inner link 41 to urge the saver link 84 from a force override state to the force transmitting state such that a substantially rigid connection is normally maintained between the saver link 84 and the inner link 41.

Thus, as seen in FIG. 11, if the chain guide 40 is stuck in the top position, and the motor linkage 34 is driven by the output shaft 70 to a low shift position, the saver link 84 will rotate in a clockwise direction in about the pivot point $P_3$ as viewed from the rear of the derailleur against the urging force the first leg portion of the saver link biasing element 85 even though the inner link 41 does not move. Accordingly, a non rigid (jamming protection) connection is formed between the saver link 84 and the inner link 41 by utilizing the saver link 84 and the saver link biasing element 85. In other words, the saver link 84 and the saver link biasing element 85 form a non-rigid connection that connects motor linkage 34 to the inner link 41. This non-rigid connection forms the jamming protection connection.

Calibration of the first and second motor end positions the motor unit output stroke will now be discussed in more detail. Basically, the rider calibrates the first and second motor end positions the motor unit output stroke to limit the prescribed maximum movement range of the front derailleur motor unit 32 to match or substantially match the mechanical stroke of the front derailleur unit 30. When this is done, the saver link biasing element 85 remains uncompressed during normal shifting operation. First, the motorized front derailleur assembly 12 is installed on the bicycle 10. Then the front derailleur motor unit 32 is driven (e.g., shifted using the shift control device 16) to the first motor end position such that the chain guide 40 near the top sprocket (the outermost one of the sprockets 21). Now, the top chain cage end position can be mechanically adjusted to exactly match the first motor end position of the front derailleur motor unit 32. Thus, the top chain cage end position is adjusted by the adjusting of the top adjustment screw 52 until the desired alignment between the chain guide 40 and the outermost one of the sprockets 21 is obtained, e.g., the chain guide 40 is centered over the outermost one of the sprockets 21.

Once the top chain cage end position has been set to match the first motor end position, the chain guide 40 is shifted to the low chain cage end position such that the chain guide 40 near the low sprocket (the innermost one of the sprockets 21). In particular, the front derailleur motor unit 32 is driven (e.g., shifted using the shift control device 16) to the second motor end position such that the front derailleur unit 30 moved to the low chain cage end position. Then the low chain cage end position is also adjusted by the adjusting of the low adjustment screw 50 until the desired alignment between the chain guide 40 and the innermost one of the sprockets 21 is obtained e.g., the chain guide 40 is centered over the innermost one of the sprockets 21. Thus, the low position is set by using the low adjustment screw 50, which contacts the fixing body 43, such that the chain guide 40 is disposed over the smaller or innermost one of the sprockets 21.

However, at this point, the low chain cage end position does not match the second motor end position of the front derailleur motor unit 32 because of an anti-jamming arrangement that is provided in the motor linkage 34 such that the front derailleur motor unit 32 continues to move the motor linkage 34 after the front derailleur unit 30 has stop at the low chain cage end position. Thus, the electronic controller 61 is operated to detect the low chain cage end position of the chain guide 40 by using the position control mechanism 65 and/or an overcurrent detection circuit on the printed circuit board 71. In particular, the electronic controller 61 controls the reversible electric motor 63 in response to the motor end position adjusting button 75 being pushed to move the chain guide 40 back and forth several times between the top chain cage end position and the low chain cage end position. When the reversible electric motor 63 is being moved from the rest position, the shutter wheel 74 starts to rotate and the current position of the reversible electric motor 63 is detected by the photointerrupter 73 sensing the movement of the shutter wheel 74. Also each time the saver link biasing element 85 begins to be compressed, an overcurrent is detected to aid in the determination of the new second motor end position that matches or substantially matches the low chain cage end position that was mechanically set. Accordingly, the electronic controller 61 measures the low chain cage end position and electronically sets a new second motor end position such that the prescribed maximum movement range is limited to match or substantially match the mechanical stroke of the front derailleur unit 30 that has been mechanically set.

While the above explanation first mechanically set the top chain cage end position to match the first motor end position and then electronically match the low chain cage end position to a new second motor end position, it is also possible to first mechanically set the low chain cage end position to match the second motor end position and then electronically match the top chain cage end position to a new first motor end position. In either case, when the motor end position adjusting button 75 is pushed by the rider, the electronic controller 61 marks the current position of the shutter wheel 74 using the photointerrupter 73. Then, the electronic controller 61 activates the reversible electric motor 63 which in turn moves the motor drive train 64 to shift the chain guide 40 via the motor linkage 34 and the links 41 and 42. This movement of the motor drive train 64 turns the shutter wheel 74 so that the photointerrupter 73 detects the position of the reversible electric motor 63 and correlates the current position of the reversible electric motor 63 to either the low or top chain cage end position of the chain guide 40.

Figure 14:
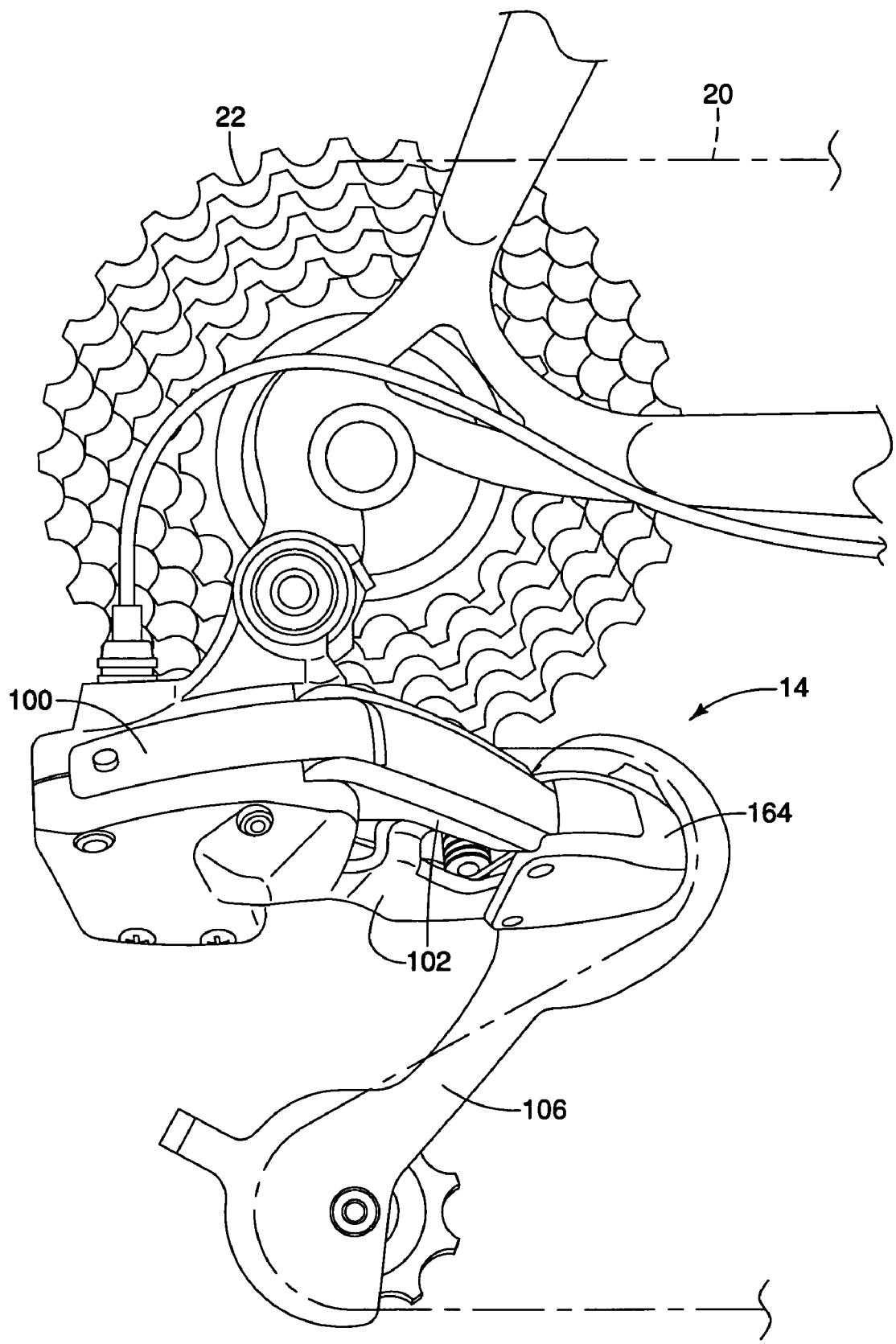
FIG. 14 is a side elevational view of the rear derailleur with the rear motor unit.

As shown in FIG. 14, the rear derailleur assembly 14 is mounted to the frame in close proximity to the sprocket unit for moving chain 20 among the plurality of rear sprockets 22. The rear derailleur assembly 14 is also constructed in a similar manner to the front derailleur assembly 12 in that the rear derailleur assembly 14 includes a motor unit 100, a movable part (a pair of links 102, a movable member 104 and a chain guide 106) with an anti-jamming arrangement (not shown) and a controller (not shown) disposed in the motor unit 100. Thus, the rear derailleur assembly 14 is also constructed in a similar manner to the front derailleur assembly 12 such that the motor unit 100 of the rear derailleur assembly 14 has a motor output stroke with a prescribed maximum movement range that is greater than a mechanical stroke of the chain guide 106 of the movable part of the rear derailleur assembly 14 and such that the controller is configured to set the motor unit output stroke to an operating movement range that is smaller than the prescribed maximum movement range so that an anti-jamming biasing element remains uncompressed during normal shifting operation.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A motorized bicycle derailleur assembly comprising:
   a motor unit including a motor output stroke with a prescribed maximum movement range;
   a movable part including
      a chain guide,
      a derailleur linkage coupled to an output shaft of the motor unit for coupling the motor unit to the chain guide such that the chain guide moves in response to activation of the motor unit,
      a mechanical adjustment device arranged to change at least one of first and second stroke end positions of a mechanical stroke of the chain guide, and
      an anti-jamming arrangement having an anti-jamming spring, the anti-jamming spring being configured and arranged to compress when the motor unit continues to apply a moving force to the movable part after the movable part reaches a lockup position corresponding to one of the first and second stroke end positions; and
   a controller configured to set a maximum motor unit output stroke to an operating movement range that is smaller than the prescribed maximum movement range and at least equal to or less than the mechanical stroke of the chain guide so that the anti-jamming spring remains uncompressed during normal shifting operation.

2. The motorized bicycle derailleur assembly according to claim 1, wherein
   the motor unit includes a position control mechanism operatively coupled to the controller to at least provide a first end position signal indicative of a first end stopping position of the motor unit to the controller.

3. The motorized bicycle derailleur assembly according to claim 1, wherein
   the mechanical adjustment device is configured and arranged to independently change both of the first and second stroke end positions of the mechanical stroke.

4. The motorized bicycle derailleur assembly according to claim 1, wherein
   the anti-jamming protection arrangement includes a saver link coupled to a derailleur linkage such that the anti-jamming spring is operatively coupled between the saver link and the derailleur linkage to urge the saver link from a force override state to a force transmitting state such that a substantially rigid connection is normally maintained between the saver link and the derailleur linkage.

5. The motorized bicycle derailleur assembly according to claim 1, wherein
   the position control mechanism includes a photointerrupter that is arranged to detect a detection part that is moved by the motor unit.

6. The motorized bicycle derailleur assembly according to claim 5, wherein
   the photointerrupter is a double-phase type photointerrupter.

7. The motorized bicycle derailleur assembly according to claim 5, wherein
   the photointerrupter is disposed in a motor unit housing that houses the motor unit.

8. The motorized bicycle derailleur assembly according to claim 1, wherein
   the motor unit includes a reversible rotary motor.

* * * * *